United States Patent
Fort, II

(10) Patent No.: US 6,895,894 B2
(45) Date of Patent: May 24, 2005

(54) BIRD FEEDER

(75) Inventor: W. Grady Fort, II, Mason, TX (US)

(73) Assignee: Daisy Manufacturing Co., Rogers, AZ (US)

( * ) Notice: Subject to any disclaimer, the term of this patent is extended or adjusted under 35 U.S.C. 154(b) by 0 days.

(21) Appl. No.: 10/339,315

(22) Filed: Jan. 10, 2003

(65) Prior Publication Data

US 2004/0134436 A1 Jul. 15, 2004

(51) Int. Cl.[7] .......................................... A01K 39/00
(52) U.S. Cl. ................................. 119/57.8; 119/51.01
(58) Field of Search ................ 119/57.8, 52.2, 119/52.3, 57.9

(56) References Cited

U.S. PATENT DOCUMENTS

| | | | | |
|---|---|---|---|---|
| 1,144,157 A | * | 6/1915 | Stroup | 119/52.3 |
| 2,591,126 A | * | 4/1952 | Breck, Jr. | 119/52.2 |
| 3,734,061 A | * | 5/1973 | Kraus | 119/52.2 |
| 4,690,101 A | * | 9/1987 | Kilham | 119/52.2 |
| 4,753,195 A | * | 6/1988 | Maggio | 119/52.2 |
| 5,046,629 A | * | 9/1991 | Weile | 215/221 |
| 5,671,696 A | * | 9/1997 | Liethen | 119/57.8 |
| 5,823,135 A | * | 10/1998 | Gilchrist et al. | 119/52.2 |
| 5,829,382 A | * | 11/1998 | Garrison | 119/52.2 |
| 6,397,732 B1 | * | 6/2002 | Jenkins | 99/341 |
| 6,443,095 B1 | * | 9/2002 | McMahon | 119/51.01 |
| 6,481,375 B1 | * | 11/2002 | Scalf | 119/52.2 |

FOREIGN PATENT DOCUMENTS

GB 2146221 A * 4/1985 .......... A01K/39/01

* cited by examiner

Primary Examiner—Teri Pham Luu
Assistant Examiner—Kimberly S. Smith
(74) Attorney, Agent, or Firm—Pillsbury Winthrop Shaw Pittman LLP

(57) ABSTRACT

A bird feeder having one or more of feeding slots, filling cap, perch support, and rain guard is disclosed. The feeding slots preferably include a narrower slot for smaller seeds and a larger slot for a larger seeds. The filling cap preferably includes a dome top. The perch support is preferably attached to the bird feeder by a plurality of spokes. Preferably, one of the spokes has a diagonal portion and a horizontal portion. The rain guard is located above the feeding ports.

36 Claims, 5 Drawing Sheets

BIRD FEEDER

BACKGROUND

1. Field of the Invention

The present invention relates generally to a bird feeder and, more particularly, to a bird feeder that can be used to feed multiple types of seeds simultaneously.

2. Background of the Invention

Typical wild bird sunflower seed feeders fall into two broad categories. The first category includes bulk or "free choice" feeders that simply have the seeds freely available to the birds in an open display. The second category uses a wire mesh through which the birds must pull the seeds.

Both categories of these bird feeders have shortcomings. Bird feeders of the first categories do not mimic natural feeding (a "hunt and seek" activity) that is desired by wild birds. Another shortcoming of these feeders is that they allow seeds to become water saturated in rain.

Wild birds appear to prefer the second categories of bird feeders partly because the wire mesh provides a more natural "hunt and seek" feeding method. Nonetheless, these mesh feeders are limited to feeding only one type of sunflower seeds. This is because the two major types of sunflower seeds used in wild bird feeding differ radically in size. The gray striped seeds can be nearly twice the size of the black oil seeds. Thus, a wire mesh that is suitable for the larger gray striped seeds would allow the smaller black oil seeds to slip through freely, resulting in much loss of seeds. Smaller wire mesh, on the other hand, would hold the black oil seeds but would not allow the majority of the gray striped seeds to pass through at all. Furthermore, all wire mesh feeders suffer from severe exposure of the seeds to rain, which causes spoilage of the seeds.

Accordingly, there is a need for a bird feeder that can be used to feed both the larger gray striped seeds and the smaller black oil seeds simultaneously.

SUMMARY OF THE INVENTION

The invention provides a bird feeder that can be used to feed large and small seeds simultaneously or singly. An embodiment of the invention includes a smaller feeding slot and a larger feeding slot. The smaller and larger feeding slots are configured to allow passage of smaller and larger seeds, respectively. In one embodiment, the smaller slots are horizontal and the larger slots are vertical. In another embodiment, both the smaller and the larger slots are horizontal and the larger slot is located below the smaller slot. A preferred embodiment of the invention includes a bottom filling cap. The bottom filling cap can be removed from the base to allow refilling of the seeds. Another preferred embodiment of the invention includes a perch support. Still another preferred embodiment of the invention includes a rain guard located above the feeding slots.

DETAILED DESCRIPTION OF PREFERRED EMBODIMENTS

The present invention provides a bird feeder that can be used to feed birds by presenting multiple sizes of seeds simultaneously or singly. For example, the invention can be configured to allow the most popular commercial types of sunflower seeds to be fed, either as single seeds type, or as a mixed blend. In an exemplary implementation, a bird feeder of the invention may be used for gray striped or black oil sunflower seeds, or a mixture of both. The invention can be configured to feed other types of sunflower seeds. The design also mimics the natural feeding activity of "hunt and seek," making it very desirable by wild birds. The bird feeder can also be configured for use by many different species of birds at the same time, species whose physical characteristics normally preclude them from all using the same feeder.

An embodiment of the invention includes one or more feeding slots, a bottom filling cap, a perch support, and a rain guard. The feeding slots can be configured to accommodate all types of commercial sunflower seeds. Furthermore, the feeding slots can be positioned to accommodate various species of birds at the same feeder. The bottom filling cap of the invention enables maximum refilling of the bird feeder. In addition, the bottom filling cap facilitate seeds to fall near the feeding slots. The perch support is placed to accommodate birds of most sizes to feed comfortably. The rain guard protect the seeds from rain. Each of these four features are further described below.

Figure 1:
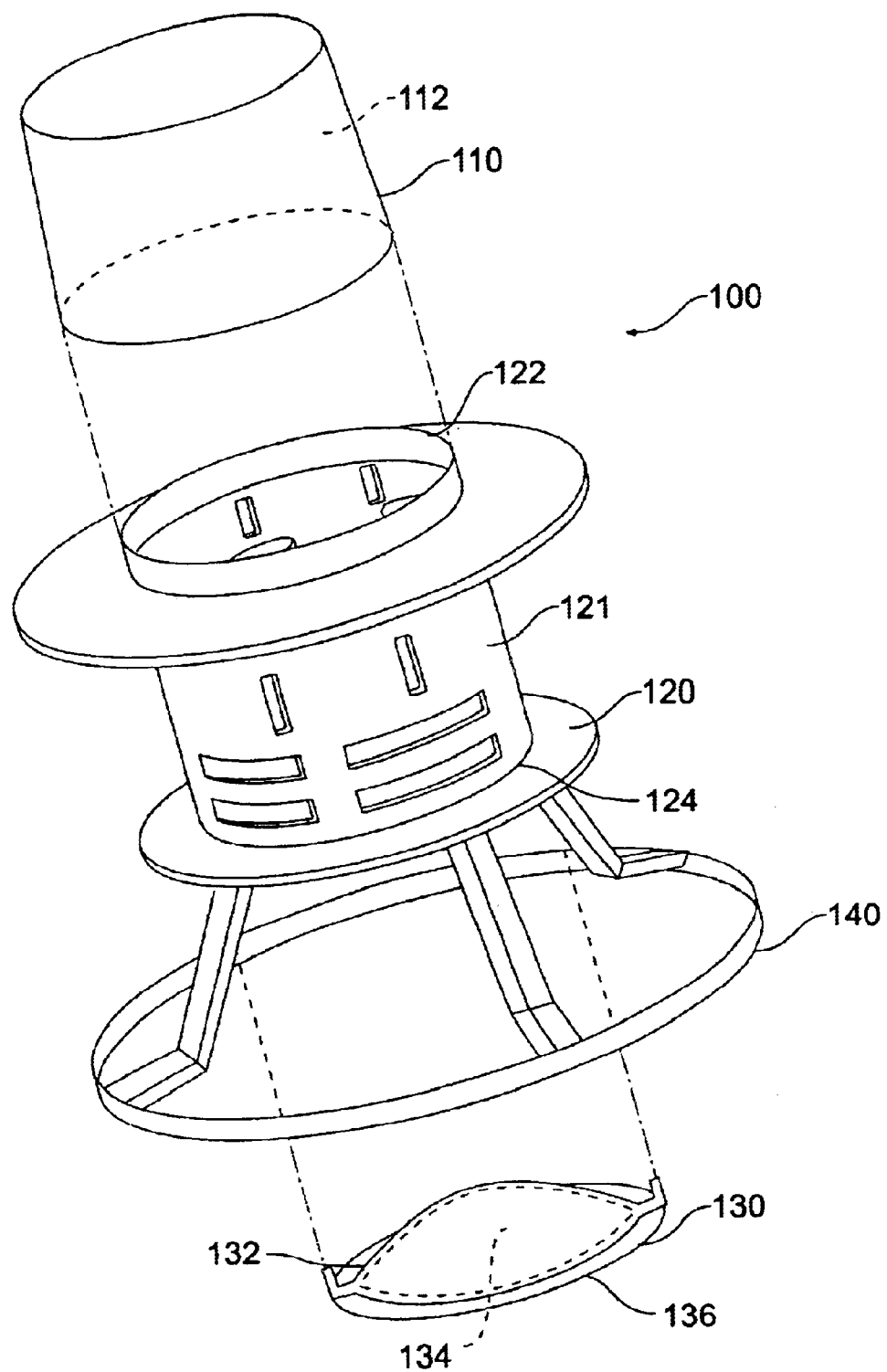
FIG. 1 is a schematic diagram showing an exploded view of an exemplary bird feeder of the invention.

As shown in FIG. 1, feeder 100 of the invention includes container 110, base 120, and filling cap 130. These three members of feeder 100 can be completely separated from each other as depicted in FIG. 1. Feeder 100 is one of many embodiments of the invention.

When fully assembled (see FIG. 2), base 120 is mated with container 110 along upper perimeter 122, and with filling cap 130 along lower perimeter 124. Perimeters 122 and 124 define the upper and lower limits of wall 121, respectively.

In another embodiment (not shown), container 110 and base 120 can be made as a single unit, i.e., they are permanently attached to each other. In still another embodiment (not shown), filling cap 130 may be configured in the form of a permanent bottom to base 120 and refilling is done by detaching container 110 from base 120.

Figure 3:
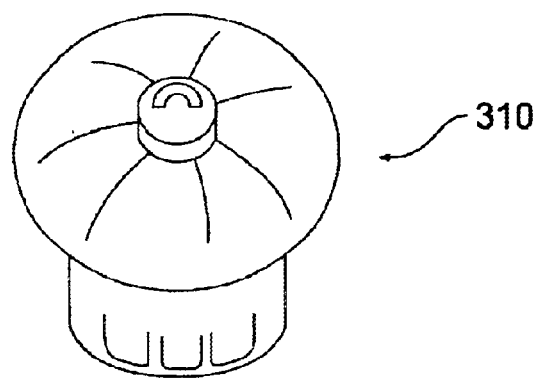
FIG. 3 is a schematic diagram showing an alternative container of the bird feeder.

Container 110 is configured to hold seeds (not shown) in cavity 112. Preferably, cavity 112 is configured to store about two pounds of seeds. Container 110 may have any shape. For example, container 110 may have a dome shape such as container 310 shown in FIG. 3. Alternatively, container 110 may be configured to have a more conventional cylindrical shape as shown in FIG. 1. Container 110 may be configured to have another shape. Container 110 may be attached to base 120 by means of mating threads, by adhesive, by screws, by rivets, or any means of snap-together or press-fit.

Figure 4:
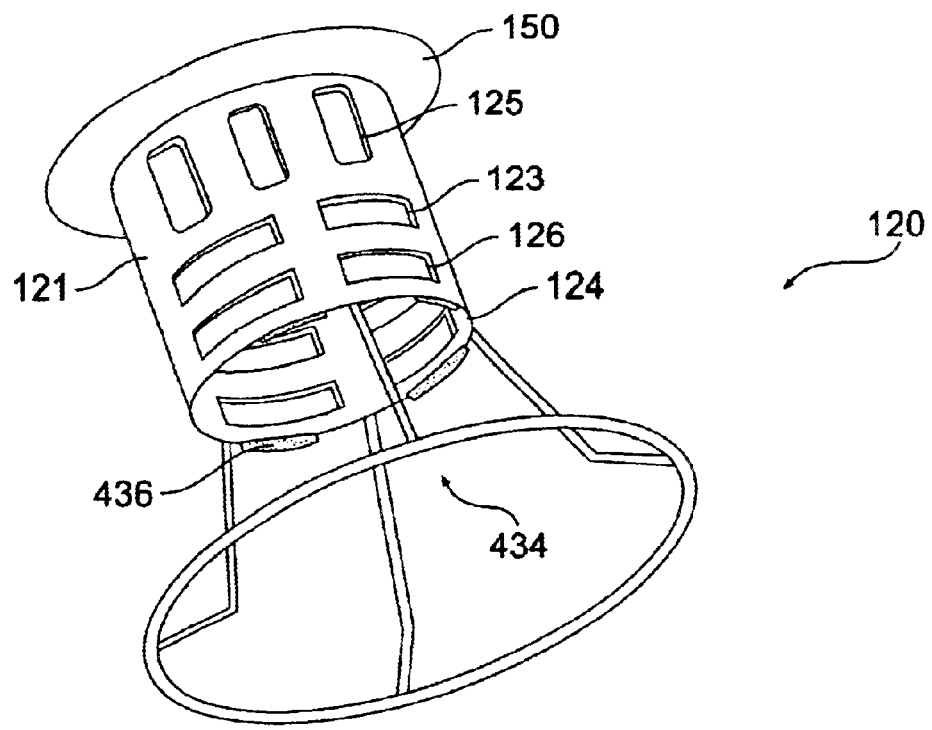
FIG. 4 is a schematic diagram showing a perspective view of an exemplary base of the bird feeder.
Figure 5:
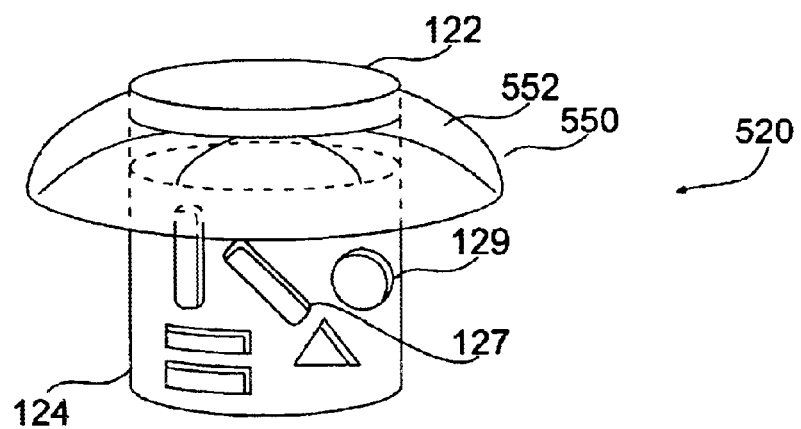
FIG. 5 is a schematic diagram showing an alternative base of the bird feeder.

As shown in FIG. 4, base 120 includes one or more feeding ports (slots 123, 125, and 126) on wall 121. Preferably, there are multiple types of feeding ports. As depicted in FIG. 4, the feeding ports can include one or more of narrow horizontal slot 123, vertical slot 125, and wide horizontal slot 126. Furthermore, as depicted in FIG. 5, the feeding ports may also include one or more of diagonal slot 127 and slot of another shape 129. Slot of another shape 129 can be a circle as shown or it may have the shape of a diamond, star, triangle, ellipse, or the like. Preferably, slot of another shape 129 can be dimensioned so that it is an elongated triangle, an elongated oval, an elongated diamond, an elongated ellipse, or the like.

Feeding ports 123, 125, and 126 are preferably roughly a rectangle in shape with oval ends as depicted in FIG. 4. Feeding ports 123, 125, and 126 are configured to allow passage of seeds as desired. For example, feeding ports 123, 125, and 126 could be large enough to allow passage of any commercial sunflower seeds including both the gray striped and the black oil seeds. Alternatively, they could be configured to allow passage of mostly the smaller black oil seeds, but not the larger gray striped seeds. In some embodiments, they are configured so the lower slots allow passage of both types of seeds, while the upper slots allow passage of mostly the black oil seeds.

It is preferable that each of narrow horizontal slots 123, on a horizontal orientation, has a shorter dimension (the width) of about 0.20 inch and a longer dimension (the length) of about 20% of the outside circumference of wall 121. Each of wide horizontal slots 126, on a horizontal orientation, has a shorter dimension (the width) of about 0.24 inch and a longer dimension (the length) of about 20% of the outside circumference of wall 121. Each of vertical slots 125, on a vertical orientation, has a shorter dimension (the width) of about 0.22 inch and a longer dimension (the height) of about 20% of the height of wall 121.

Feeding ports 123, 125, and 126 allow birds to access the seeds within feeder 100. In the preferred embodiment depicted in FIG. 4, feeding ports 123, 125, and 126 are configured horizontally and vertically. Smaller birds such as titmouse, nuthatch, or various kinds of finch and sparrow readily use horizontal feeding slots 123 and 126. Larger birds with thicker, blockier beaks like cardinals or grosbeaks use the upper vertical feeding slots 125, which preferably have a wider width to accommodate larger beaks.

In the preferred embodiment, the width of narrow horizontal feeding slots 123 is narrower than that of the wide horizontal feeding slots 126. For example, in an exemplary bird feeder of the invention, the width of wide horizontal slots 126 can be about 0.24 inch while the width of narrow horizontal feeding slots 123 can be about 0.20 inch. This allows the larger gray striped seeds to sift downward during use and these larger seeds can then be accessed and removed at the lower level. Thus, by varying the opening size of feeding ports 123 and 126, both types of seeds may be fed at the same time.

Meanwhile, vertical feeding slots 125 are made wider to accommodate the blunter beaks of some bird species. They are also positioned near the top of the feeding area because these larger beaked birds are also taller. In the preferred embodiment, vertical feeding slots 125 are about 0.22 inch wide.

The arrangement of feeding ports 123, 125, and 126 on wall 121 may be designed in a number of ways and still be effective. For example, there may be only one slot or a series of slots on wall 121. The slot or slots may be all run horizontally, or all vertically, or all on the diagonal, or in any combination of these orientations.

Feeding ports 123, 125, and 126 may be all the same length or they may have varying lengths. They may be all the same width, or they may have varying width. Furthermore, they may also have varying widths within the same length of slot.

Figure 7:
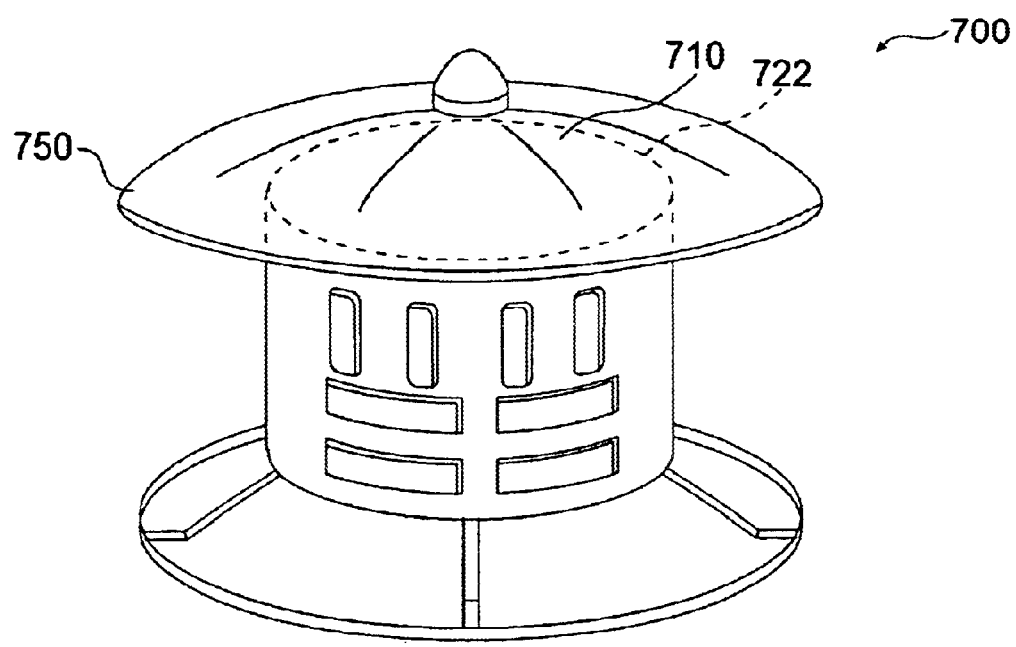
FIG. 7 is a schematic diagram showing a perspective view of another exemplary bird feeder of the invention.

In another embodiment of the invention depicted in FIG. 7, bird feeder 700 does not include a container. As depicted, bird feeder 700 includes top surface 710. Preferably, top surface 710 extends beyond upper perimeter 722 to form rain guard 750. In this embodiment, bird feeder 700 differs from bird feeder 100 in at least one aspect. That is, bird feeder 100 includes upper perimeter 122 that is configured to be mated with container 110, but bird feeder 700 includes upper perimeter 722 that is configured to support top surface 710.

Filling cap 130 is configured to be mated with lower perimeter 124 of base 120. As shown in FIG. 4, lower perimeter 124 defines access 434 to the interior of base 120.

Figure 6:
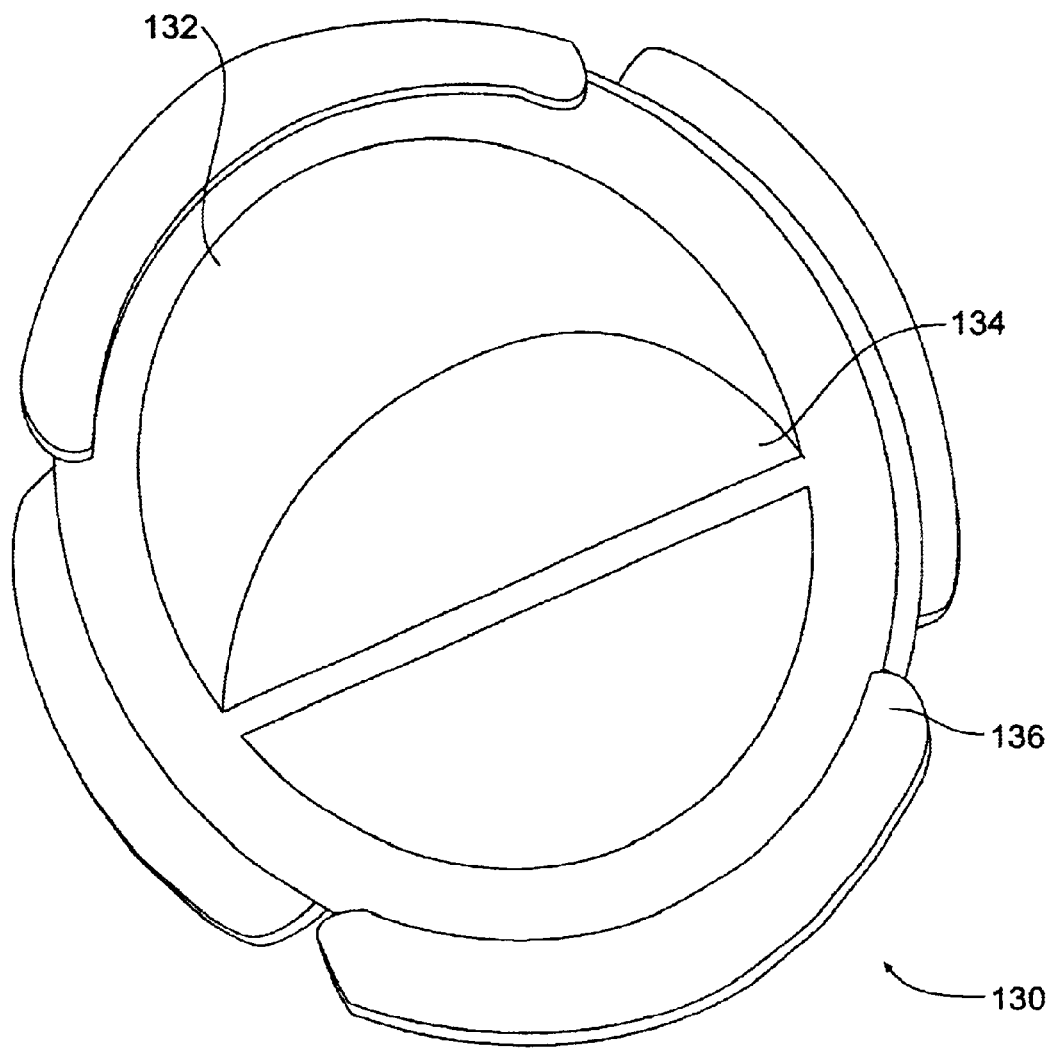
FIG. 6 is a schematic diagram showing a perspective view of an exemplary filling cap of the bird feeder (as seen from the bottom).

FIG. 6 is a schematic diagram showing a perspective view of an exemplary filling cap of bird feeder 100 as seen from the bottom. Filling cap 130 includes top 132, handle 134, and lips 136. When filling cap 130 is attached to base 120, top surface 132 supports the seeds within bird feeder 100. Handle 134 enables filling cap 130 to be attached on or removed from base 120. Lips 136 provides a mechanism that secures filling cap 130 onto lower perimeter 124 of base 120.

Preferably, top 132 has a dome shape as shown in FIGS. 1 and 6. The dome shape facilitates seeds within bird feeder 100 to fall along lower perimeter 124. The features is useful because as the amount of seeds decreases within bird feeder 100, the remaining seeds would tend to fall along lower perimeter 124, resulting in an easier access by birds.

Preferably, handle 134 is substantially perpendicular to lips 136. Preferably, handle 134 has a semi-circular shape as shown in FIGS. 1 and 6.

Preferably, lips 136 are configured to mate with corresponding tongues 436 of lower perimeter 124 (see FIG. 4). Preferably, there are four lips 136 and four corresponding tongues 436. This configuration allows filling cap 130 to be mated with base 120 when a user lines up four lips 136 with four tongues 436, and then twists filling cap about 90 degrees in one direction so that tongues 436 and lips 136 interlock each other.

In another embodiment, filling cap 130 can be configured to be attached to base 120 using another mechanism. For example, filling cap 130 can be snapped onto base 120 rather than being rotated into it.

When filling cap 130 is detached, seeds can be placed within base 120 via access 434.

Figure 8:
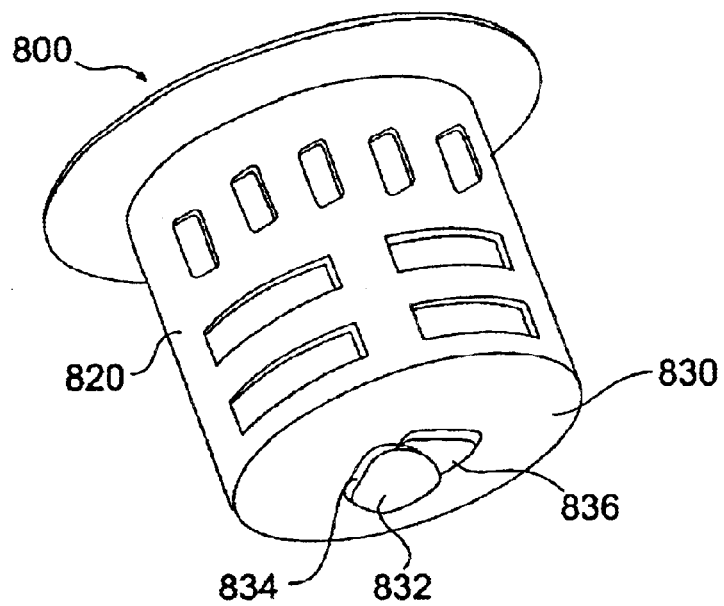
FIG. 8 is a schematic diagram showing an alternative filling cap of the invention.

In still another embodiment, filling cap 130 is not completely detachable from base 120. As shown in FIG. 8, base 820 of bird feeder 800 includes lid 832 on bottom surface 830 of base 820. Lid 832 can be pivotally rotated about hinge 834 so that seeds can be placed in bird feeder 800 via hole 836. A perch support associated with bird feeder 800 is not shown for clarity.

Feeder 100 can be utilized by a user as follows. First, filling cap 130 is separated from base 120. This can be accomplished by rotating filling cap 130 relative to base 120 so that filling cap is detached from lower perimeter 124. Next, Feeder 100 is turned upside down and seeds are placed in feeder 100 through access 434 that is defined by lower perimeter 124.

Next, base 120 and filling cap 130 are reunited. This is accomplished by rotating one or both of base 120 and filling cap 130 to secure them together.

The twist-and-open filling cap 130 is unique because it allows complete filling of feeder 100 with seeds. Other designs make it impossible to completely fill or waterproof the feeder, or make it very awkward in doing so, because they fill from the top. This simple, one handed operation, allows the entire feeder 100 to be filled quickly and easily, yet filling cap 130 is not accessible to birds, strong wind, or rain.

Figure 2:
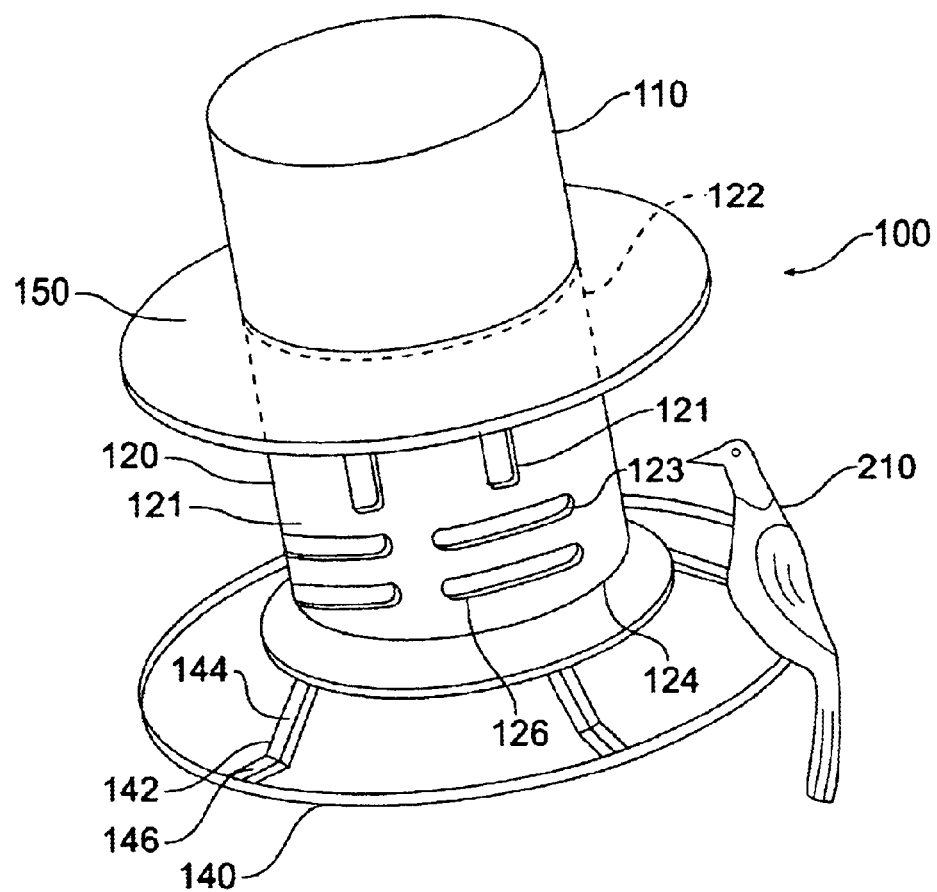
FIG. 2 is a schematic diagram showing a perspective view of the bird feeder fully assembled.

Preferably, as shown in FIG. 2, base 120 further includes perch support 140. Perch support 140, as depicted in FIG. 2, is configured to support bird 210 to obtain the seeds through feeding ports 123, 125, and 126. Perch support 140 is connected to base 120 via spokes 142. Preferably, spokes 142 includes diagonal portion 144 and horizontal portion 146. Smaller birds can rest on diagonal portion 144 or horizontal portion 146 to obtain food from feeding ports 123, 125, and 126. Larger birds can stand on perch support 140 itself as depicted in FIG. 2. Perch support 140 can be located at the same elevation of wide horizontal slot 126. Perch support 140 can also be located at a lower elevation, e.g., up to about five inches lower than wide horizontal slot 126.

If base 120 has a circular cross section with a base diameter, then perch support 140 would be a ring with a perch diameter that is larger than the base diameter. If base 120 has a cross section of a different shape, e.g., a square or a rectangle, then perch support would have a corresponding shape, such as a four-sided "ring."

Base 120 can be further configured to include rain guard 150. Rain guard 150 as depicted in FIG. 2, is configured to keep rain from running into feeding ports 123, 125, and 126, yet does not obstruct bird 210's view. In one embodiment, rain guard 150 is about one-half inch above the highest point of feeding ports 123, 125, and 126. In another embodiment, rain guard 150 is located about three inches above the bottom of wide horizontal slot 126. In still another embodiment, rain guard 150 can be located about five inches above perch support 140. The unique placement of rain guard 150 allows larger birds such as a cardinal to sit upright on perch support 140, yet easily duck under to feed.

Preferably, rain guard 150 is flat and at right angle orientation to wall 121 and is an integral part of base 120. Alternatively, as shown in FIG. 5, rain guard 550 has a dome shape. Preferably, rain guard 550 is detachable from base 520. Rain guard 550 can be configured to have a snap-on fit. Preferably, rain guard 550 is equipped with ribs 552. Ribs 552 adds strength to rain guard 550. In addition, if rain guard 550 is configured to have a translucent color, ribs 552 can refract light from the translucent color to make rain guard 550 more visible and attractive.

In the embodiment shown in FIG. 7, rain guard 750 of bird feeder 700 is an extension of top surface 710.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A bird feeder comprising:
    a base configured to receive multiple types of seeds, the base comprises a plurality of feeding slots located on a wall between a lower perimeter and an upper perimeter of the base;
    a first subset of the plurality of feeding slots comprising a first feeding slot having a first dimension sized to allow passage of smaller seeds from the base but block passage of larger seeds from the base said first dimension defining a narrow vertical slot; and
    a second subset of the plurality of feeding slots comprising a second feeding slot having a second dimension sized to allow passage of the smaller and larger seeds from the base; wherein the second subset of the plurality of feeding slots are located at a lower level nearer the lower perimeter of the base than the first subset of the plurality of feeding slots, whereby larger seeds can be accessed and removed at the lower level said second dimension defining a narrow horizontal slot; and
    a third subset of the plurality of feeding slots comprising a third feeding slot having a third dimension sized larger than the first dimension.

2. The bird feeder of claim 1, wherein the second dimension is larger than the third dimension.

3. The bird feeder of claim 1, wherein all of the first subset of the plurality of feeding slots are narrow vertical slots.

4. The bird feeder of claim 3, wherein the first dimension is about 0.20 inch and the second dimension is about 0.24 inch.

5. The bird feeder of claim 1, wherein all the second subset of the plurality of feeding slots are narrow vertical slots.

6. The bird feeder of claim 1, wherein the second dimension is about 0.22 inch.

7. The bird feeder of claim 1, wherein the second dimension is about 0.20 inch.

8. The bird feeder of claim 1, wherein the second dimension is about 0.24 inch.

9. The bird feeder of claim 1, wherein the third feeding slot is located above the first feeding slot.

10. The bird feeder of claim 9, wherein the third feeding slot is a vertical slot.

11. The bird feeder of claim 10, wherein the first dimension is about 0.22 inch.

12. The bird feeder of claim 10, wherein the second dimension is about 0.20 inch.

13. The bird feeder of claim 10, wherein the third dimension is about 0.24 inch.

14. A bird feeder comprising:
    a base having a lower perimeter and a plurality of feeding ports above the lower perimeter, the lower perimeter defines an access to an interior of the base, wherein a first subset of the plurality of feeding ports are sized with a first dimension defining a narrow vertical port to allow passage of a first type of seeds but block passage of a second type of seeds and a second subset of he plurality of feeding ports are sized with a second dimension defining a narrow horizontal port to allow passage of the second type of seeds, wherein all of the first subset of plurality of feeding ports and all of the second dubset of the plurality of feeding ports are located on a wall of the base above the lower perimeter, wherein the second subset of the plurality of feeding ports are located at a lower level nearer the lower perimeter of the base than the first subset of the plurality of feeding ports, whereby larger seeds can be accessed and removed at the lower level, and wherein a third subset of the plurality of feeding ports comprise a third feeding port having a third dimension sized larger than the first dimension; and
    a filling cap configured to be attached to the lower perimeter during a feeding mode of the bird feeder, and detached from the lower perimeter during a filling mode of the bird feeder.

15. The bird feeder of claim 14, wherein the filling cap includes a dome shape top.

16. The bird feeder of claim 14, wherein the filling cap includes one or more lips configured to be mated with the lower perimeter.

17. The bird feeder of claim 14, wherein the filling cap includes a handle.

18. The bird feeder of claim 14, wherein the filling cap includes a lid configured to rotate about a hinge on the base.

19. A bird feeder comprising:
a base having a plurality of feeding slots and a lower perimeter, wherein the plurality of feeding slots are located above the lower perimeter, wherein a first subset of the plurality of feeding slots are sized with a first dimension defining a narrow vertical slot to allow passage of a first type of seeds but block passage of a second type of seeds and a second subset of the plurality of feeding slots are sized with a second dimension defining a narrow horizontal slot to allow passage of the second type of seeds, wherein all of the first subset of the plurality of feeding slots and all of the second subset of the plurality of feeding slots are located on a wall of the base above the lower perimeter, wherein the second subset of the plurality of feeding slots are located at a lower level nearer the lower perimeter of the base than the first subset of the plurality of feeding slots, whereby larger seeds can be accessed and removed at the lower level, and wherein a third subset of the plurality of feeding slots comprises a third feeding slot having a third dimension sized larger than the first dimension; and
a perch support attached to the base along the lower perimeter.

20. The bird feeder of claim 19, wherein the perch support is located at an elevation ranging between the same elevation of the plurality of feeding slots and about five inches lower than the plurality of feeding slots.

21. The bird feeder of claim 19, wherein the perch support is attached to the base by a plurality of spokes.

22. The bird feeder of claim 21, wherein at least one of the plurality of spokes has a diagonal portion and a horizontal portion.

23. A bird feeder comprising:
a base having a plurality of feeding slots located on a wall between an upper perimeter and a lower perimeter of the wall, wherein a first subset of the plurality of feeding slots are sized with a first dimension defining a narrow vertical slot to allow passage of a first type of seeds but block passage of a second type of seeds and a second subset of the plurality of feeding slots are sized with a second dimension defining a narrow horizontal slot to allow passage of the second type of seeds, wherein all of the first subset of the plurality of feeding slots and all of the second subset of the plurality of feeding slots are located on the wall between the lower perimeter and the upper perimeter, wherein the second subset of the plurality of feeding slots are located at a lower level nearer the lower perimeter of the base than the first subset of the plurality of feeding slots, whereby larger seeds can be accessed and removed at the lower level, and wherein a third subset of the plurality of feeding slots comprises a third feeding slot having a third dimension sized larger than the first dimension; and
a rain guard attached to the base at a position above the plurality of feeding slots.

24. The bird feeder of claim 23, wherein the rain guard is an integral part of the base.

25. The bird feeder of claim 23, wherein the rain guard is removable from the base.

26. The bird feeder of claim 23, wherein the rain guard has a translucent appearance.

27. The bird feeder of claim 23, wherein the rain guard has a dome shape.

28. The bird feeder of claim 23, wherein the rain guard has one or more ribs.

29. The bird feeder of claim 23, wherein the rain guard is about one-half inch above the plurality of feeding slots.

30. The bird feeder of claim 23, further comprising a perch support attached to the base below the plurality of feeding slots.

31. The bird feeder of claim 30, wherein the rain guard is about five inches above the perch support.

32. A bird feeder comprising:
a base having a wall located between an upper perimeter and a lower perimeter;
a plurality of feeding slots located on the wall, wherein a first subset of the plurality of feeding slots are sized with a first dimension defining a narrow vertical slot to allow passage of a first type of seeds but block passage of a second type of seeds and a second subset of the plurality of feeding slots are sized with a second dimension defining a narrow horizontal slot to allow passage of the second type of seeds, wherein all of the first subset of the plurality of feeding slots and all of the second subset of the plurality of feeding slots are located on the wall between the lower perimeter and the upper perimeter, wherein the second subset of the plurality of feeding slots are located at a lower level nearer the lower perimeter of the base than the first subset of the plurality of feeding slots, whereby larger seeds can be accessed and removed at the lower level, and wherein a third subset of the plurality of feeding slots comprises a third feeding slot having a third dimension sized larger than the first dimensions; and
a filling cap configured to be detachably attached to the lower perimeter.

33. The bird feeder of claim 32, wherein the plurality of feeding slots include slots of a uniform dimension.

34. The bird feeder of claim 32, wherein the plurality of feeding slots include slots of varying dimensions.

35. The bird feeder of claim 32, wherein the plurality of feeding slots includes a dimension between about 0.20 inch and about 0.24 inch.

36. The bird feeder of claim 32, wherein the filling cap includes a dome shape top.

* * * * *